July 25, 1961  N. C. H. FISCHERSTRÖM  2,994,061
TRAFFIC SIGNALLING MEANS FOR VEHICLES
Filed Nov. 18, 1957

United States Patent Office 2,994,061
Patented July 25, 1961

2,994,061
TRAFFIC SIGNALLING MEANS FOR VEHICLES
Nils Claes Hugo Fischerström, Mossvagan 6,
Stocksund, Sweden
Filed Nov. 18, 1957, Ser. No. 697,186
7 Claims. (Cl. 340—108)

This invention relates to a traffic signalling device for vehicles, especially motor cars.

The object of the invention is to provide a reliable signalling device which allows the driver of a motor vehicle to signal to other users of the road in an internationally adaptable manner. The problems solved by the present invention will appear hereinafter.

In traffic there often arise situations of doubt. For example, only a relatively few road crossings are provided with traffic light signals. At the majority of the crossings, the decision is left to the driver. At crossings of similar precedence the left hand rule or the right hand rule determines who may proceed first, but in spite of this (depending on the cars' distances from the crossing, the ability of the respective drivers and their intentions) there often arise hesitation and a necessity to signal to other persons using the road. At crossings of different precedence, one road being a major road, hesitation arises even more frequently as there may be different interpretations as to which road is the major road. Pedestrians wishing to cross a road often hesitate to cross as they do not know whether a car is going to stop or not. For example, it has been found at crossings for school children that the children in spite of a signal to cross, dare not do so as they are uncertain whether fast cars are going to stop or not. Frequently a beginner, a driver of a car containing old or infirm passengers or a driver of a light car wants to let another car pass, e.g. a faster car or a bus or truck. Hand signalling through a side window is not convenient when it is cold or dark.

It is equally important to be able to signal when slowing down or overtaking. It is increasingly common for fast cars to run closely behind a preceding car. Stronger braking lights provide no improvement as such lights are actuated simultaneously with slowing down or stopping. Thus, there is a demand for a pronounced warning sign which is independent of slowing down.

Before passing a vehicle it is desirable that a signal be provided indicating that the driver ahead is prepared to be overtaken. Prior attempts of the kind showing a sign "Overtake" do not meet requirements as they might make the signalling driver responsible for any accident. A hand signal beckoning forwards has the same defect and makes judge of the situation the one being overtaken who has no knowledge of the acceleration of the other driver's car or of his resolution. This sign, watched for by the driver behind, must not necessarily be particularly pronounced.

The traffic signalling device according to the invention comprises an electrical signalling system having a "clear" or "safe passing" lamp (preferably green) which throws light forwardly, and an electrical warning lamp, which throws light rearwardly, and consists in that the "clear" and warning lamps are electrically connected to a source of current through a common switch located within reach of the driver and that the "clear" and warning lamps are arranged to throw substantially parallel beams of light rearwardly towards the driver's seat, preferably at an oblique angle to the driver's eyes when in normal driving position.

The fact that the light beams from the lamps of both kinds are parallel allows the driver to simultaneously and directly observe them both and check their proper function.

Preferably the "clear" lamp is located at or adjacent a rear view mirror and is arranged to throw a portion of its light directly against the driver's seat. While the warning lamp is preferably located at or adjacent the rear view mirror, it may, however, also be located at the rear part of the vehicle, preferably with free sight between said lamp and a rear view mirror, in which case said lamp is arranged to throw a portion of its light also in a forward direction against the rear view mirror. Obviously, the embodiments just mentioned will be preferred as the driver normally frequently observes the rear view mirror and this mirror in any case normally is located at least within the range of indirect vision from the driver's eye, being directed forwards. Moreover, the warning lamp advantageously is located immediately inside the rear window of closed cars provided with such a window.

The warning lamp preferably is yellow, internationally indicating the necessity of cautionsness. This is especially tru when the yellow light is flashing or alternating between two lamps. Therefore, the warning lamp according to the invention preferably cooperates with a flash relay and may be divided into two lamps with alternating light. Preferably, the alternating warning lamps besides being connected through the common switch to a source of current together with the "clear" lamp also are connected in series with a flash relay and a source of current through a separate electrical switch.

The invention may be performed in various different ways but one specific embodiment will now be described by way of example with reference to the accompanying drawings, in which.

Figure 1:
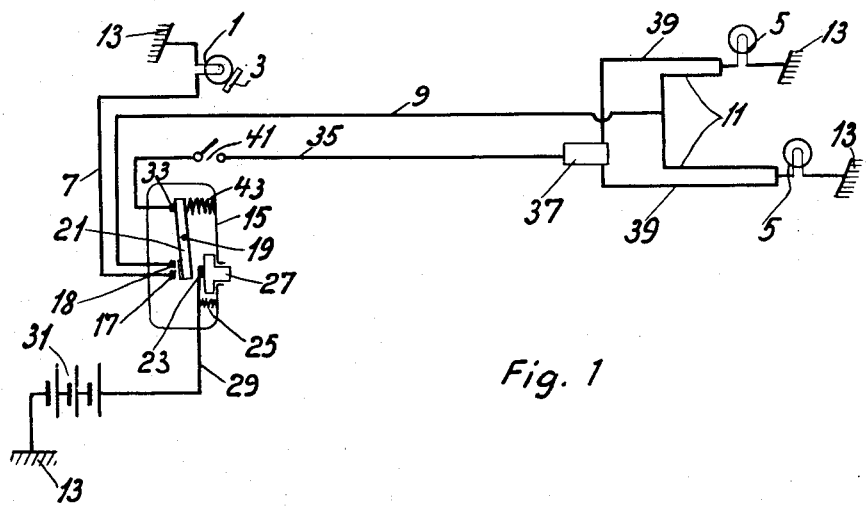
FIG. 1 is a schematic wiring diagram of the electrical system.

A "clear" lamp 1, located at or adjacent a rear view mirror 3 is connected to a fixed contact 17 of an electrical switch device 15 by means of a wire 7. Two warning lamps 5, centrally located inside the rear window for example, one uppermost and one lowermost, are connected to a fixed contact 18, corresponding to the contact 17 and arranged in the electrical switch device 15, by means of another wire 9 and branch wires 11 for each of said lamps 5. All lamps also are connected to the vehicle ground 13. The electrical switch device, which is common to the "clear" lamp and the warning lamps comprises the fixed contacts 17 and 18, a contact member in the form of a switch lever 21, pivoted at 19, and a movable contact 23, which by means of a spring 25 or the like is kept in rest position away from the contact lever 21 intermediate said movable contact 23 and the fixed contacts 17 and 18, and which by an actuating member, as a push button 27, is movable against the action of the spring 25 first to contact the switch lever 21, which at rest is kept in engagement with a fixed contact 33 by means of a thrust spring 43, and then further away together with said lever so as to simultaneously therewith engage the two fixed contacts 17 and 18. The movable contact 23 is by means of a wire 29 connected to a source of current, viz. the battery 31, which is connected to ground 13. When the push button 27 is fully depressed connection is established between the battery 31 and the lamps 1 and 5, so that all lamps are lighted constantly as long as the push button is fully depressed.

The two warning lamps 5 are further connected to the fixed contact 33 of a separate switch 33, 21, 23 in the electrical switch device 15 by means of a relay line 35, containing a flash relay 37, which is connected to the lamps 5 by means of branch wires 39. The relay line 35 includes a switch off contact 41 for disconnection of the flash device, e.g. when driving in a community for a longer period. When the contact 41 is closed a partial depressing of the push button 27 to cause electrical connection between movable contact 23 and lever 21 obviously connects the lamps 5 to the battery 31 through the flash relay 37 so that these lamps will light up alternately.

The switch lever 21 normally is kept in off position by means of the spring 43 and when depressing the push button 27 against action of the spring 25 it is, upon reaching the lever 21, also necessary to overcome the reaction force of spring 43 to establish contact with the fixed contacts 17 and 18, so as to get constant light from the "clear" and warning lamps.

Figure 2:
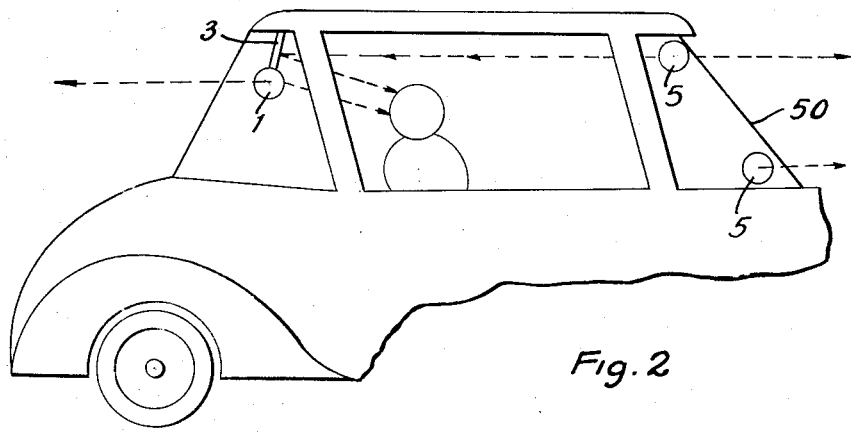
FIG. 2 is a diagrammatic illustration of the location of the "clear" and "warning" lamps on the motor vehicle.

Thus, the device described is such that a single actuating member, common to the common switch as well as the separate switch, is arranged to close in a first actuated position (after an off position) the circuit of the separate switch and to close in a second actuated position, having first cut said circuit of the separate switch, the circuit of the common switch. Thus, the different lamps are controlled by one single push button with two actuated positions, so that upon the first stage depression the warning lamps will light alternately and upon further depression the warning lamps are lit constantly together with the "clear" lamp. Preferably, the "clear" lamp is located centrally inside the windshield adjacent the rear view mirror, and the warning lamps preferably are located centrally of and adjacent the upper or lower edges of the the rear window 50 (FIG. 2).

With the device described the following signalling thus may be performed:

(1) Only a rearwardly directed alternating signal, upon partial depression of the button 27 to the first-stage position. This signal may be given prior to braking, thereby extending the reaction time for the driver behind. This signal also may be given after receipt of an overtaking signal from behind. While yellow light normally has a "take care" meaning the driver still leaves the decision of passing to the driver behind. This sign can and should be given without the forwardly directed "clear" signal as such a signal might mislead someone to cross the road.

(2) A signal rearwardly, first with alternating and then with constant yellow light, indicating the precedence of crossing cars. Cars behind are then not authorized to pass. By depressing the push button to the first-stage position only alternating light is passed, intended to alarm the driver behind, and thereafter upon further depression of the push button the light is changed to constant yellow light, indicating that someone is crossing.

(3) A forwardly-directed signal with green light from the "clear" lamp and a simultaneous constant rearwardly-directed yellow light indicating that in communities precedence is left for crossing cars (or confirmation of a stop sign from another car or a policeman).

It should be noted that the signalling described does not imply anything over the presently used methods, e.g. beckoning or signalling with the signal horn or the lights to an overtaking car.

What I claim is:

1. A traffic signalling device for motor vehicles comprising a forwardly-directed lamp secured to the vehicle adjacent the longitudinal central axis thereof, at least one rearwardly-directed warning lamp secured to the vehicle adjacent the rear end thereof, a voltage source mounted on the vehicle, means including a common switch controllable by the operator of the vehicle for simultaneously connecting said lamps to said voltage source, and means for simultaneously directing portions of the light rays from said lamps in parallel beams toward the eyes of the vehicle operator.

2. A traffic signalling device as defined in claim 1 wherein said vehicle has a rear view mirror, said forwardly directed lamp being mounted adjacent said rear view mirror.

3. Apparatus as defined in claim 2 wherein said warning lamp is mounted at the rear of the vehicle and is arranged to direct a portion of its light rays forwardly upon said rear view mirror.

4. A traffic signalling device for motor vehicles comprising a forwardly-directed lamp secured to the vehicle, at least one rearwardly-directed warning lamp secured to the vehicle, a voltage source mounted on the vehicle, a switch operable by the operator of the vehicle and having three stationary contacts and one movable contact, circuit means connecting said movable contact to said voltage source, circuit means including a flasher relay connecting a first one of said stationary switch contacts to said warning lamp, circuit means connecting a second one of said stationary switch contacts to said warning lamp, circuit means connecting a third one of said stationary switch contacts to said forwardly directed lamp, said switch including actuating means for first electrically connecting said movable contact to said first stationary contact and for secondly breaking the connection of said movable contact with said first stationary contact and for making simultaneous electrical connection of said movable contact with said second and third stationary contacts.

5. Apparatus as defined in claim 4 and further wherein said switch actuating means includes first spring means normally restraining said movable contact against electrical connection with said first stationary contact.

6. Apparatus as defined in claim 5 and further wherein said switch actuating means includes second spring means normally restraining said movable contact against electrical connection with said second and third stationary contacts.

7. A traffic signalling device for motor vehicles comprising a forwardly-directed lamp secured to the vehicle, at least one rearwardly-directed warning lamp secured to the vehicle, a voltage source mounted on the vehicle, control switch means on the vehicle operable by the operator thereof, first circuit means operable by said control switch means and including a flasher relay for intermittently lighting said warning lamp with said forwardly-directed lamp being in an unlit state, and second circuit means operable by said control switch means for simultaneously lighting both said forwardly-directed lamp and said warning lamp.

References Cited in the file of this patent

UNITED STATES PATENTS

| 1,370,674 | Smith | Mar. 8, 1921 |
| 1,553,959 | Pirkey | Sept. 15, 1925 |
| 1,611,706 | Adolphson et al. | Dec. 21, 1926 |
| 1,771,566 | Anderson | July 29, 1930 |
| 1,972,090 | Getty | Sept. 4, 1934 |
| 2,025,349 | Jabusch | Dec. 24, 1935 |
| 2,119,549 | Lochman | June 7, 1938 |
| 2,141,992 | Kershaw | Dec. 27, 1938 |
| 2,300,896 | Hosmer | Nov. 3, 1942 |
| 2,706,809 | Hollins | Apr. 19, 1955 |
| 2,769,043 | Ulinski | Oct. 30, 1956 |
| 2,815,501 | Benson et al. | Dec. 3, 1957 |

FOREIGN PATENTS

| 594,393 | France | June 20, 1925 |